United States Patent
Herron

(10) Patent No.: US 10,835,870 B2
(45) Date of Patent: Nov. 17, 2020

(54) METHODS OF MANUFACTURING A MULTI-LEAF MEMBRANE MODULE AND MULTI-LEAF MEMBRANE MODULES

(71) Applicant: FLUID TECHNOLOGY SOLUTIONS (FTS), INC., Albany, OR (US)

(72) Inventor: John Herron, Albany, OR (US)

(73) Assignee: FLUID TECHNOLOGY SOLUTIONS (FTS), INC., Albany, OR (US)

( * ) Notice: Subject to any disclaimer, the term of this patent is extended or adjusted under 35 U.S.C. 154(b) by 114 days.

(21) Appl. No.: 15/761,184

(22) PCT Filed: Sep. 23, 2016

(86) PCT No.: PCT/US2016/053321
§ 371 (c)(1),
(2) Date: Mar. 19, 2018

(87) PCT Pub. No.: WO2017/053709
PCT Pub. Date: Mar. 30, 2017

(65) Prior Publication Data
US 2018/0264411 A1    Sep. 20, 2018

Related U.S. Application Data

(60) Provisional application No. 62/232,062, filed on Sep. 24, 2015.

(51) Int. Cl.
*B01D 63/10*    (2006.01)
*B01D 53/22*    (2006.01)
(Continued)

(52) U.S. Cl.
CPC ............ *B01D 63/10* (2013.01); *B01D 53/22* (2013.01); *B01D 61/08* (2013.01); *B01D 63/061* (2013.01);
(Continued)

(58) Field of Classification Search
CPC .... B01D 63/061; B01D 63/10; B01D 63/103; B01D 65/003; B29C 53/562
See application file for complete search history.

(56) References Cited

U.S. PATENT DOCUMENTS

| 3,872,014 A | 3/1975 | Schell |
| 4,944,877 A | 7/1990 | Maples |

(Continued)

FOREIGN PATENT DOCUMENTS

| EP | 2318125 A1 | 5/2011 |
| WO | 2005016498 A1 | 2/2005 |

(Continued)

OTHER PUBLICATIONS

International Search Report and Written Opinion for International Application No. PCT/US2016/053321 dated Feb. 3, 2017.

(Continued)

*Primary Examiner* — Carson Gross
(74) *Attorney, Agent, or Firm* — Dorsey & Whitney LLP

(57) ABSTRACT

Embodiments described herein are directed to methods of manufacturing a multi-leaf membrane module for filtering product fluid flow (e.g., food products or wastewater) and such multi-leaf membrane modules. In an embodiment, a multi-leaf membrane module is disclosed. The multi-leaf membrane module includes a permeate fluid flow tube defining a permeate fluid flow channel for permeate, and a membrane sheet spirally wound about the permeate fluid flow tube. The membrane sheet includes two or more leaves. Each of the two or more leaves includes a feed spacer (Continued)

including at least one opening formed therein that at least partially defines a feed channel for product fluid flow therethrough and a permeate structure defining a permeate fluid flow channel. The permeate structure of each of the two or more leaves includes at least one membrane and at least one porous permeate spacer.

12 Claims, 9 Drawing Sheets

(51) Int. Cl.
*B32B 1/08* (2006.01)
*B32B 5/02* (2006.01)
*B32B 7/12* (2006.01)
*B32B 23/20* (2006.01)
*B32B 3/22* (2006.01)
*B32B 15/20* (2006.01)
*B32B 27/30* (2006.01)
*B32B 3/28* (2006.01)
*B01D 65/08* (2006.01)
*B32B 23/06* (2006.01)
*B32B 3/08* (2006.01)
*B32B 15/08* (2006.01)
*B32B 15/18* (2006.01)
*B32B 3/04* (2006.01)
*B01D 61/08* (2006.01)
*B32B 27/32* (2006.01)
*B32B 3/26* (2006.01)
*B32B 27/12* (2006.01)
*B32B 27/36* (2006.01)
*B32B 27/08* (2006.01)
*B01D 63/06* (2006.01)
*B29C 53/56* (2006.01)

(52) U.S. Cl.
CPC ........... *B01D 63/103* (2013.01); *B01D 65/08* (2013.01); *B32B 1/08* (2013.01); *B32B 3/04* (2013.01); *B32B 3/085* (2013.01); *B32B 3/22* (2013.01); *B32B 3/266* (2013.01); *B32B 3/28* (2013.01); *B32B 5/024* (2013.01); *B32B 5/028* (2013.01); *B32B 7/12* (2013.01); *B32B 15/08* (2013.01); *B32B 15/18* (2013.01); *B32B 15/20* (2013.01); *B32B 23/06* (2013.01); *B32B 23/20* (2013.01); *B32B 27/08* (2013.01); *B32B 27/12* (2013.01); *B32B 27/302* (2013.01); *B32B 27/304* (2013.01); *B32B 27/308* (2013.01); *B32B 27/32* (2013.01); *B32B 27/36* (2013.01); *B01D 2313/143* (2013.01); *B01D 2313/146* (2013.01); *B01D 2313/23* (2013.01); *B01D 2313/24* (2013.01); *B01D 2315/10* (2013.01); *B29C 53/562* (2013.01); *B32B 2250/05* (2013.01); *B32B 2250/24* (2013.01); *B32B 2250/44* (2013.01); *B32B 2262/02* (2013.01); *B32B 2262/0276* (2013.01); *B32B 2262/101* (2013.01); *B32B 2307/726* (2013.01); *B32B 2307/732* (2013.01); *B32B 2597/00* (2013.01)

(56) References Cited

U.S. PATENT DOCUMENTS

| | | | |
|---|---|---|---|
| 5,096,584 A | 3/1992 | Reddy et al. | |
| 5,114,582 A | 5/1992 | Sandstrom et al. | |
| 5,275,726 A | 1/1994 | Feimer et al. | |
| 5,458,774 A | 10/1995 | Mannapperuma | |
| 5,538,642 A | 7/1996 | Solie | |
| 2006/0219635 A1* | 10/2006 | McCague | C25D 13/24 210/651 |
| 2009/0145838 A1 | 6/2009 | Knappe et al. | |
| 2014/0130963 A1 | 5/2014 | Jons et al. | |

FOREIGN PATENT DOCUMENTS

| | | |
|---|---|---|
| WO | 2013085664 A1 | 6/2013 |
| WO | 2015030448 A1 | 3/2015 |
| WO | 2015049497 A1 | 4/2015 |

OTHER PUBLICATIONS

U.S. Appl. No. 62/232,062, filed Sep. 24, 2015.

* cited by examiner

METHODS OF MANUFACTURING A MULTI-LEAF MEMBRANE MODULE AND MULTI-LEAF MEMBRANE MODULES

CROSS-REFERENCE TO RELATED APPLICATIONS

This application claims priority to U.S. Provisional Application 62/232,062 filed on 24 Sep. 2015, the disclosure of which is incorporated herein, in its entirety, by this reference.

BACKGROUND

Membrane modules for dewatering food products or wastewaters (e.g., landfill leachate) are often limited by fouling. One approach to control fouling is to pump fluid at relatively high velocity tangential to a membrane surface of the membrane module, and to eliminate all obstructions in a feed channel of the membrane module. Membrane modules with no spacers contacting the membrane on the feed channel are known as "open channel" membrane modules. Typically, open channel membrane modules have a tubular or a plate and frame design, whereas the standard economical spiral wound membrane module design includes a feed spacer.

Spiral wound membrane modules having open feed channels have been developed. For example, an open channel, low pressure reverse osmosis membrane module for "under the counter" home use has been developed, but such a membrane module has difficulty withstanding significant crossflow velocity. Another process for producing an open channel membrane module for dewatering highly fouling fluids has also been developed, which can tolerate relatively high crossflow velocities and was successful in concentrating very fouling fluids. However, the method of manufacturing such an open channel membrane module can be cumbersome and limited to a single membrane leaf per element.

Accordingly, users and manufacturers of spiral wound membrane modules continue to seek improvements thereto.

SUMMARY

Embodiments disclosed herein are directed to methods of manufacturing a spiral wound, multi-leaf membrane module for filtering/separating product fluid flow (e.g., food products or wastewater) and such multi-leaf membrane modules. In an embodiment, a method of manufacturing a multi-leaf membrane module is disclosed. A membrane sheet including two or more leaves is provided. Each of the two or more leaves includes a feed spacer having at least one removable section and a permeate structure including at least one membrane and at least one permeate spacer. While adhesive in the permeate structure is at least partially uncured, the membrane sheet is spiral wound around a permeate fluid flow tube. The adhesive is allowed to at least partially cure while the membrane sheet is wound around the permeate fluid flow tube. After the adhesive is at least partially cured, the membrane sheet is at least partially unwound from the permeate fluid flow tube. While the membrane sheet is at least partially unwound, the at least one removable section from the feed spacer of each of the two or more leaves is removed to form at least one opening therein that at least partially defines a product fluid flow channel. After removing the at least one removable section, the membrane sheet having the at least one opening therein is spiral wound about the permeate fluid flow tube to form the membrane module.

In an embodiment, a multi-leaf membrane module is disclosed. The multi-leaf membrane module includes a permeate fluid flow tube defining a permeate fluid flow channel for permeate, and a membrane sheet spirally wound about the permeate fluid flow tube. The membrane sheet includes two or more leaves. Each of the two or more leaves includes a feed spacer including at least one opening formed therein that at least partially defines a feed channel for product fluid flow therethrough and a permeate structure defining a permeate fluid flow channel. The permeate structure of each of the two or more leaves includes at least one membrane and at least one porous permeate spacer.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical elements or features in different views or embodiments shown in the drawings.

DETAILED DESCRIPTION

Embodiments disclosed herein are directed to methods of manufacturing a spiral wound, multi-leaf membrane module for filtering/separating product fluid flow (e.g., food products or wastewater) and such multi-leaf membrane modules. The membrane modules disclosed herein may be used for membrane separation in, for example, apple juice clarification, wastewater treatment, cheese whey desalting, potable water production, oil-water emulsion separation, salt water for desalination, and many other suitable applications.

The membrane modules disclosed herein include a membrane sheet having two or more leaves each of which has a feed spacer and a permeate spacer/membrane(s) structure.

The membrane sheet of the membrane modules disclosed herein may be relatively shorter than if only one leaf was used, yet still enabling at least the same or greater separation efficiency for the membrane module. By employing a membrane sheet including two or more leaves, permeate fluid flow through a given permeate spacer travels a relatively shorter distance to reach a permeate flow tube, which reduces the pressure drop in the permeate channel. In some applications, this reduced pressure drop can increase net applied pressure and, thus, increases membrane flux.

Figure 1:
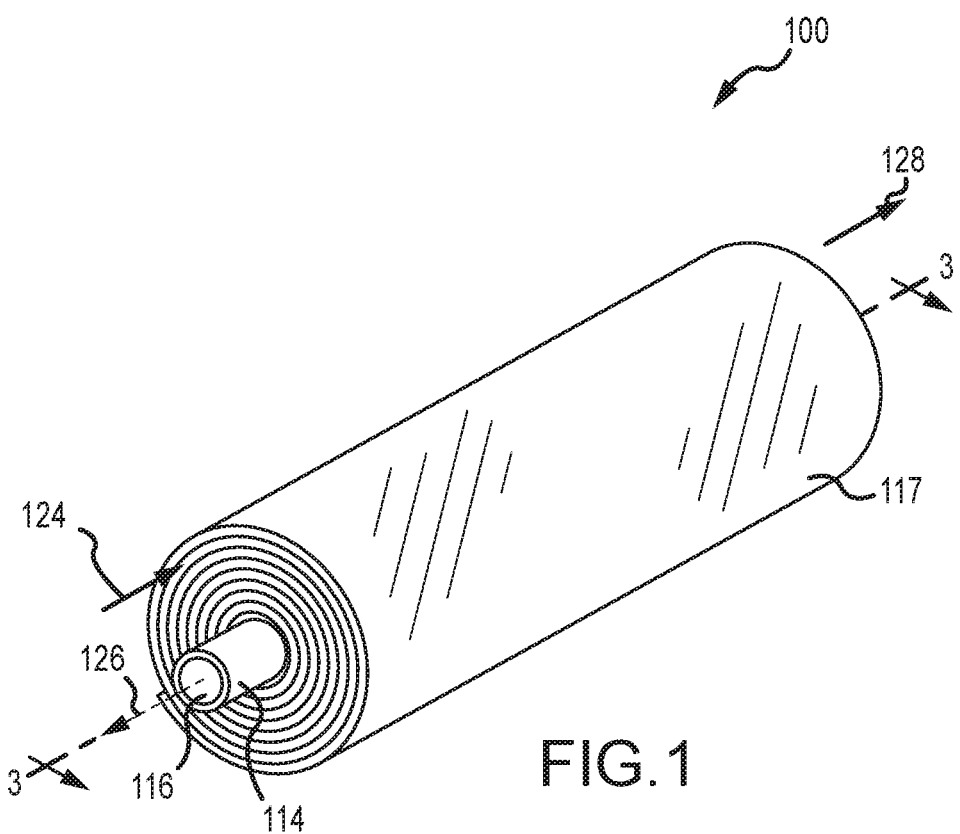
FIG. 1 is a schematic isometric view of a multi-leaf membrane module, according to an embodiment.
Figure 2A:
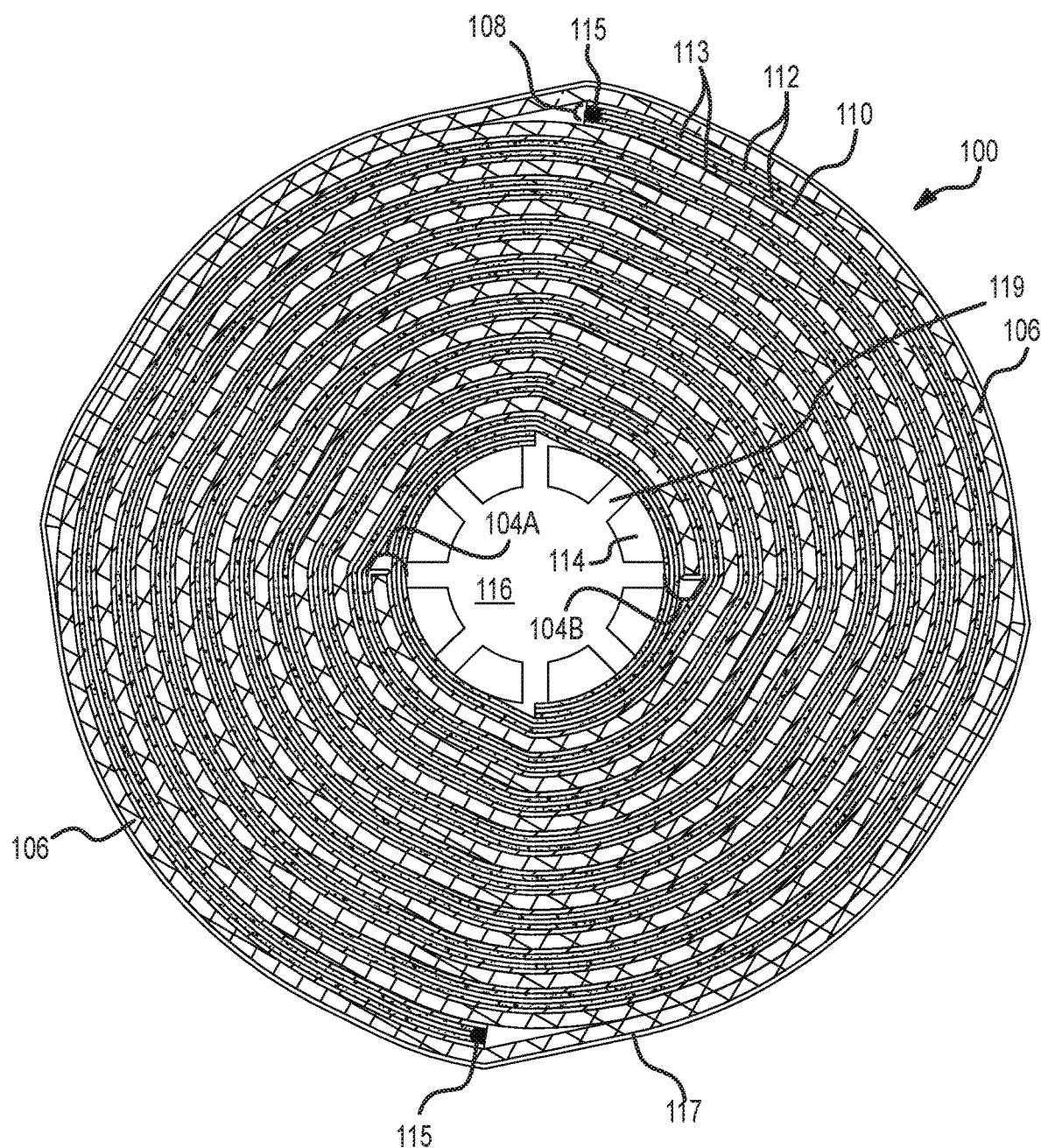
FIG. 2A is an enlarged front end view of the membrane module of FIG. 1.
Figure 2B:
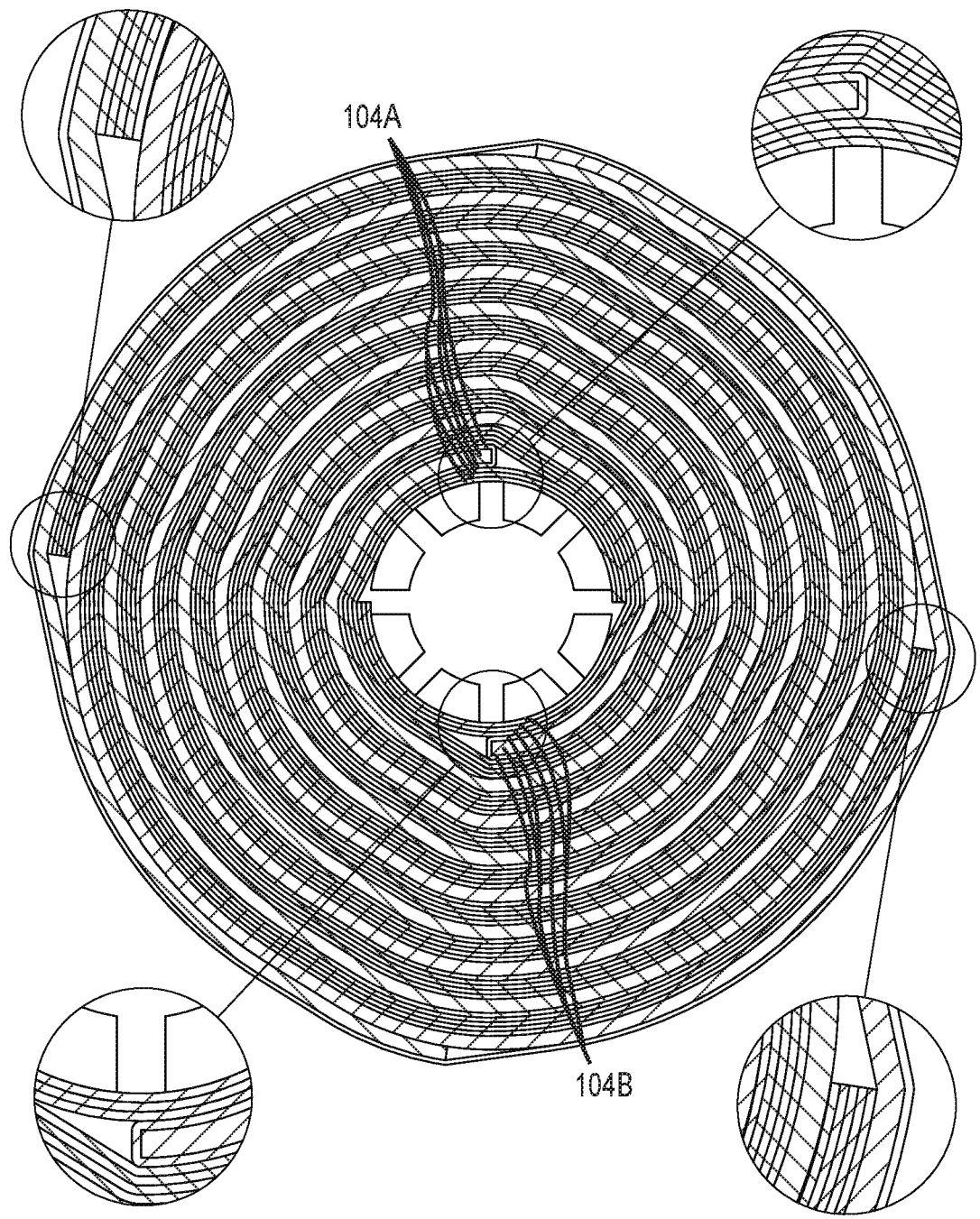
FIG. 2B is an enlarged front end view of the membrane module of FIG. 1, with different leaves thereof shown with different cross-hatching.

FIG. 1 is a schematic isometric view and FIGS. 2A-2B are enlarged front end view of a spiral wound, multi-leaf membrane module 100, according to an embodiment. Referring to FIGS. 1 and 2A, the membrane module 100 includes a membrane sheet having two or more leaves 104A and 104B that are also referred to herein as leaves 104. With reference to FIG. 2B, the leaves 104A and 104B alternate with each other along a radial direction of the membrane module 100. In FIG. 2B, the leaf 104A is shown with cross-hatching to the left and the leaf 104B is shown with cross-hatching to the right.

Referring again to FIG. 2A, each of the leaves 104 includes a feed spacer 106 layered with a permeate structure 108. The permeate structure 108 includes a stiffener layer 110 sandwiched between two porous permeate spacers 112, and at least one membrane 113 adjacent to a radially outermost one of the two porous permeate spacers 112. For example, for the leaf 104A, a radially outermost one of the membranes 113 is associated with the leaf 104A, while a radially innermost one of the membranes 113 adjacent to the permeate structure 108 of the leaf 104A is associated with the other leaf 104B. Stated another way, each of the leaves 104 includes one of the membranes 113 positioned radially inwardly from the corresponding feed spacer 106 thereof.

The membranes 113 are bonded to the porous permeate spacers 112 along only three sides thereof using an adhesive 115, such as a suitable glue (e.g., a polyurethane-based glue or other suitable glue). The side of the membranes 113 of the permeate structures 108 proximate to permeate fluid flow tube 114 is not bonded to the underlying porous permeate spacers 112 thereof via the adhesive 115 so there is a free fluid path through the porous permeate spacers 112 to the permeate fluid flow tube 114 that is not obstructed by the adhesive. The thickness of the membranes 113 in FIG. 2 is illustrated thicker relative to the thickness of the permeate structure 108 than if the membranes 113 were drawn to scale.

As shown in FIG. 2A, a terminal end of each feed spacer 106 of one of the leaves 104 proximate to the permeate fluid flow tube 114 is enclosed by the membrane 113 associated with the leaf 104. For example, the terminal end of the feed spacer 106 can have the membrane 113 associated therewith wrapped around it. By enclosing the terminal end of each of the feed spacers 116, product fluid flow 124 and permeate fluid flow 126 may be prevented from mixing together and/or the product fluid flow 124 may be prevented from being pumped directly into the permeate fluid flow tube 114.

The membrane sheet, including the leaves 104 thereof, is spiral wound about and supported by the permeate fluid flow tube 114. The permeate fluid flow tube 114 defines a permeate fluid flow channel 116 for permeate to flow therethrough. As will be discussed in more detail below with regard to the method of manufacturing illustrated in FIG. 7, the stiffening layer 110 provides sufficient rigidity to the permeate structure 108 to facilitate spiral winding of the membrane sheet, while maintaining the desired arrangement of the components of the membrane module 100.

A protective shell 117 may enclose a circumference of the spiral wound membrane sheet to hold the spiral wound membrane sheet in place, seal the circumference of the membrane module 102, and protect the components of the membrane module 100 such as the feed spacers 106 and the permeate structures 108. For example, the protective shell 117 may be formed from fiberglass, plastic shrink-wrapped onto the circumference of the spiral wound membrane sheet, another suitable composite material, or another suitable material.

It should be noted that although only two leaves 104 are shown in the illustrated embodiment for ease of illustration, the number of leaves in the membrane modules disclosed herein may vary from one embodiment to the next. For example, in other embodiments, the membrane sheet may include at least three leaves 104, at least four leaves 104, at least five leaves 104, at least six leaves 104, at least seven leaves 104, at least eight leaves 104, at least nine leaves 104, at least ten leaves 104, at least eleven leaves 104, fifteen or more leaves 104, or even twenty or more leaves 104.

Figure 3:
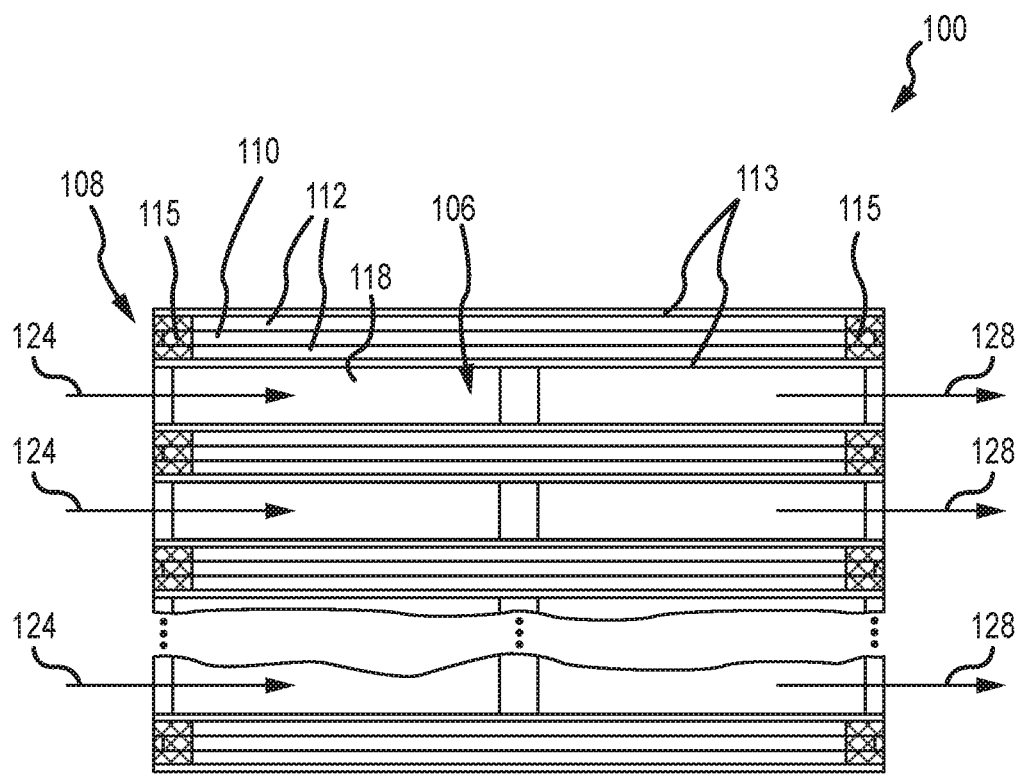
FIG. 3 is a partial, cross-sectional view of the membrane module of FIG. 1 taken along line 3-3 thereof.

Referring to FIG. 3, which is a partial, cross-sectional view of the membrane module 100 of FIG. 1 taken along line 3-3 thereof, each of the feed spacers 106 includes two or more openings 118 formed therein that partially defines a feed channel for the product fluid flow 124 to flow therethrough. Each opening 118 of a respective feed spacer 106 is in fluid communication with an adjacent permeate structure 108 to enable a portion of product fluid from the product fluid flow 124 to diffuse through the membrane 113 of an adjacent permeate structure 108 and allow the permeate to travel through the porous permeate spacers 112 of the adjacent permeate structure 108 to the permeate fluid flow tube 114. It should be noted that although the feed spacer 106 of the illustrated embodiment shown in FIG. 3 includes two openings, in other embodiments, the feed spacers disclosed herein may include only one opening or three or more openings.

Figure 4:
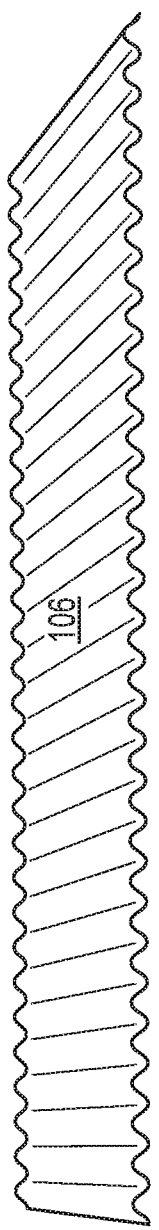
FIG. 4 is an isometric view of a feed spacer having a corrugated configuration prior to installation in the membrane module of FIG. 1, according to an embodiment.

The feed spacers 106 may be formed from a corrugated spacer material. For example, FIG. 4 is an isometric view of the feed spacer 106 having a corrugated configuration prior to installation in the membrane module 100, according to an embodiment. However, in other embodiments, the feed spacer 106 may be formed from a polymeric mesh rather than a corrugated material.

Figure 5:
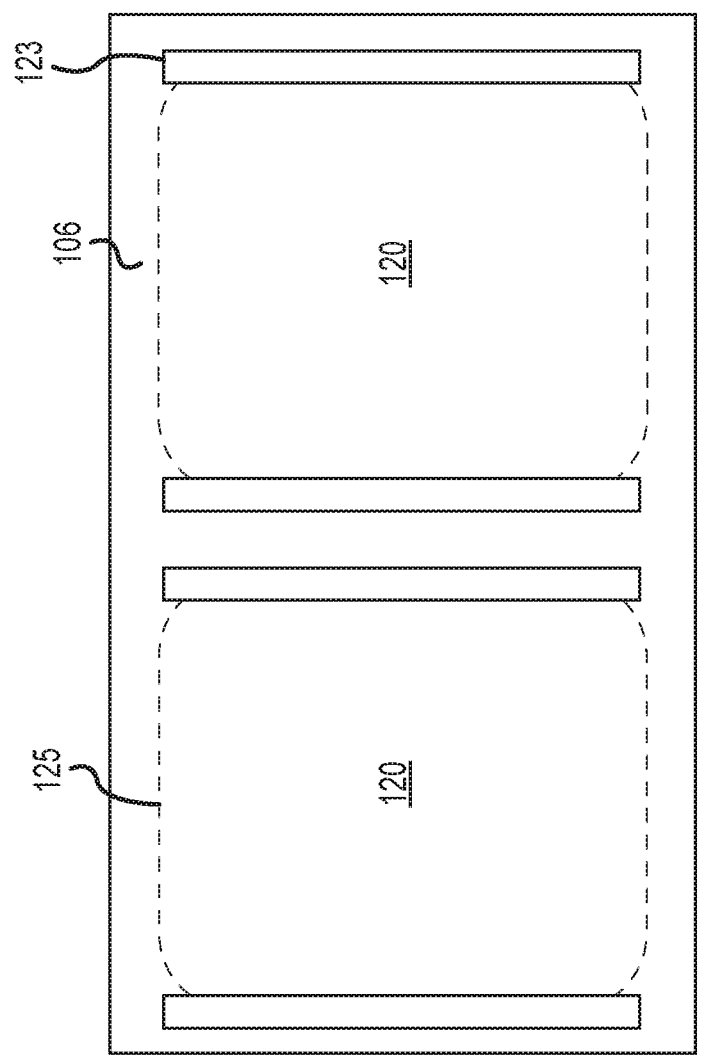
FIG. 5 is a top plan view of the feed spacer of FIG. 4 prior to removing removable sections thereof, according to an embodiment.
Figure 6:
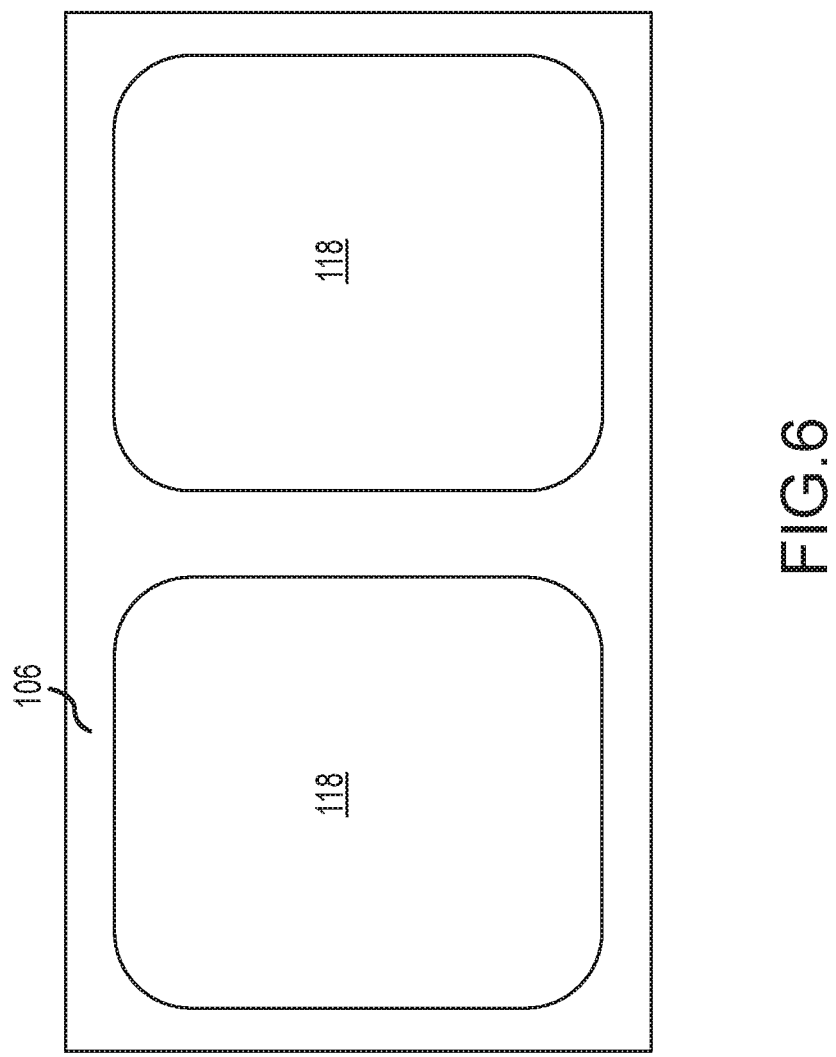
FIG. 6 is a top plan view of the feed spacer of FIG. 5 after removing removable sections thereof, according to an embodiment.

As will be discussed in more detail below with regard to the method of manufacturing illustrated in FIG. 7, as shown in the top plan view of FIG. 5, the openings 118 of the feed spacers 106 may be formed by selectively removing removable sections 120. In an embodiment, the removable sections 120 may be temporarily secured to the feed spacer 106 via one or more of adhesive tape 123, other suitable adhesive, or perforations 125. FIG. 6 is a top plan view of the feed spacer 106 of FIG. 5 after removing removable sections 120 thereof to form the openings 118, according to an embodiment.

The thickness and materials of the feed spacer 106 of the leaves 104 may vary from one embodiment to the next. For example, the feed spacers 106 may be formed from polyethylene, polypropylene, polystyrene, polyester, any other appropriate material, or combinations thereof, and may be in the form of a corrugated structure and/or a mesh. The thickness of the feed spacer 106 may be, for example, about 0.020 inch to about 0.20 inch, such as about 0.045 inch to about 0.10 inch.

The thickness and materials of the permeate structure 108 of the leaves 104 may vary from one embodiment to the next. For example, the stiffening layer 110 of the permeate structure 108 may be formed from a plastic sheet material.

The plastic sheet material for the stiffening layer 110 may be formed of polyvinyl chloride ("PVC"), chlorinated polyvinyl chloride ("C-PVC") polypropylene, polyethylene, polystyrene, acrylic, stainless steel, copper, copper alloys, tin, tin alloys, aluminum, aluminum alloys, or combinations thereof. For example, the stiffener layer 110 may be polyethylene for food uses, PVC for non-food uses, or C-PVC for high temperature uses. The thickness of the stiffening layer 110 may be, for example, about 0.010 inch to about 0.080 inch, such as about 0.020 inch to about 0.050 inch.

The porous permeate spacers 112 of the permeate structures 108 through which permeate fluid flow 126 flows to the permeate flow tube 114 may be formed from a mesh or net made from a polymeric material, such as polyester, epoxy-coated polyester, or other plastics. The thickness of the porous permeate spacers 112 may be, for example, about 0.0050 inch to about 0.10 inch, such as about 0.010 inch to about 0.030 inch.

The thickness and materials of the membranes 113 of the permeate structures 108 of the leaves 104 may vary from one embodiment to the next. For example, the membrane 113 may be formed from a multi-layer structure including a cellulose layer supported by a dense cellulose foam embedded with a woven polyester having a net of thickness of about 0.001 inch to about 0.005 inch. The thickness of the membrane 113 may be, for example, about 0.0030 inch to about 0.010 inch, such as about 0.0045 inch to about 0.0060 inch or about 0.0050 inch to about 0.0060 inch.

In a specific embodiment, the feed spacers 106 may be formed from polystyrene having a thickness of about 0.085 inch, the stiffening layer 110 may be formed from polystyrene having a thickness of about 0.030 inch, the porous permeate spacers 112 may be formed from epoxy-coated polyester having a thickness of about 0.020 inches, and the membranes 113 may be formed from cellulose triacetate ("CTA") having a thickness of about 0.0060 inch.

Referring to FIG. 1, in operation, the product fluid flow 124 is pumped by a pump (not shown) to flow into the feed spacers 106 of the membrane module 100 through the openings in the corrugations or porous mesh. The product fluid flow 124 flows through the feed spacers 106 and the feed channels thereof partially defined by the openings 118 (FIG. 3). For example, the product fluid flow 124 may include apple juice, wastewater, greywater for potable water production, oil-water emulsion, salt water for desalination, or other suitable fluid flow to be separated. As the product fluid flow 124 flows through the feed spacers 106, a portion of the product fluid flow 124 diffuses through an adjacent membrane 113 of an adjacent permeate structure 108 under the pressure and selectively filters/separates selective chemical(s) from the product fluid flow 124 to generate the permeate fluid flow 126. The permeate fluid flow 126 flows in a spiraling path through the porous permeate spacers 112 of the adjacent permeate structure 108 along the remaining length thereof to pass through openings 119 (FIGS. 2A-2B) formed in an exterior of the permeate fluid flow tube 114 that are in fluid communication with the permeate fluid flow channel 116. Thus, when the product fluid flow 124 enters one of the feed spacers 106 located radially inwardly relative to another feed spacer 106, the permeate fluid flow 126 travels a relatively shorter distance to the permeate fluid flow tube 114. The permeate fluid flow 126 that flows through the openings 119 in the permeate fluid flow tube 114 and flows through and out of the permeate fluid flow channel 116 of the permeate fluid flow tube 114. The product fluid flow 124 that exits the membrane module 100 exhibits a higher concentration of the chemical(s) being filtered/separated and is referred to as concentrate fluid flow 128. The concentrate fluid flow 128 may be recirculated into the membrane module 100 as product fluid flow 124 for further filtration/separation, as desired or needed. Furthermore, in some embodiments, a plurality of the membrane modules 100 may be fluidly connected in series.

The membrane module 100 may be formed from a relatively shorter membrane sheet than if only one leaf 104 was used. For example, the membrane sheet may have a length of about 20 inch to about 40 inch, such as about 30 inch. Furthermore, by using two or more leaves 104, the permeate fluid flow 126 travels a relatively shorter distance to reach the permeate flow tube 114, which reduces the pressure drop.

Figure 7:
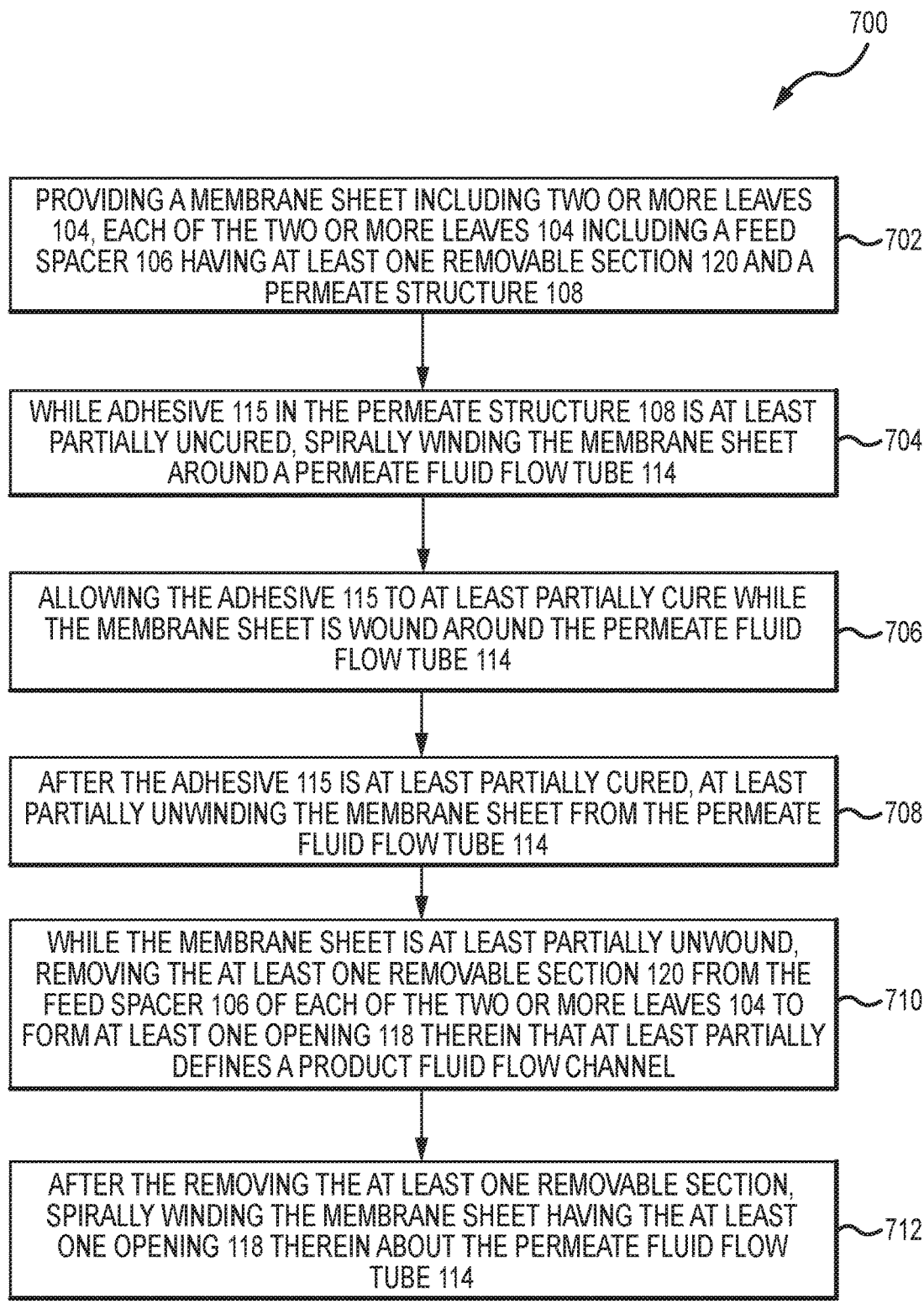
FIG. 7 is a flow chart illustrating a method of manufacturing the membrane module of FIG. 1, according to an embodiment.

FIG. 7 is a flow chart illustrating a method 700 of manufacturing the membrane module 100 of FIG. 1, according to an embodiment. The method 700 includes acts 702, 704, 706, 708, 710, and 712, which will be discussed in more detail below.

Act 702 includes providing a membrane sheet including two or more leaves 104, each of the two or more leaves 104 including a feed spacer 106 having at least one removable section 120 and a permeate structure 108. Act 704 includes while adhesive 115 in the permeate structure 108 is at least partially uncured, spirally winding the membrane sheet around a permeate fluid flow tube 114. Act 706 includes allowing the adhesive 115 to at least partially cure while the membrane sheet is wound around the permeate fluid flow tube 114.

Act 708 includes after the adhesive 115 is at least partially cured, at least partially unwinding the membrane sheet from the permeate fluid flow tube 114. Act 710 includes while the membrane sheet is at least partially unwound, removing the at least one removable section 120 from the feed spacer 106 of each of the two or more leaves 104 to form two or more openings 118 therein each of which at least partially defines a product fluid flow channel. Act 712 includes after removing the at least one removable section, spirally winding the membrane sheet having the two or more openings 118 therein about the permeate fluid flow tube 114.

In an embodiment, the method 700 further includes forming a protective shell 117 about an exterior of the spiral wound membrane sheet. For example, the protective shell may be formed of fiberglass that is wrapped around a circumference of the spiral wound membrane sheet, plastic shrink-wrapped onto the circumference of the spiral wound membrane sheet, or other suitable technique.

In an embodiment, the act 710 of removing the at least one removable section 120 from the feed spacer 106 of each of the two or more leaves 104 includes breaking perforations 125 (FIG. 5) on the feed spacer 106 of each of the two or more leaves 104 so that the at least one removable section 120 may be removed. In other embodiments, when adhesive tape 123 (FIG. 5) is employed to hold the removable sections in place, the act 710 of removing the at least one removable section 120 from the feed spacer 106 of each of the two or more leaves includes removing the adhesive tape 123 on the feed spacer 106 of each of the two or more leaves 104 followed by removing the at least one removable section 122. Regardless of whether perforations or adhesive is used, while the membrane sheet is at least partially unwound, the at least one removable section 120 may be removed from the feed spacer 106 of each of the two or more leaves 104 to form the two or more openings 118 therein by an operator inserting their hand and manually removing the at least one removable section 120. The stiffening layer 110 of the permeate structures 108 provides sufficient rigidity to the permeate structure 108 to facilitate spiral re-winding of the membrane sheet about the permeate fluid flow tube 114 so that the permeate structures 108 do not protrude through the openings 118 formed by removing the at least one removable section 120.

Figure 8:
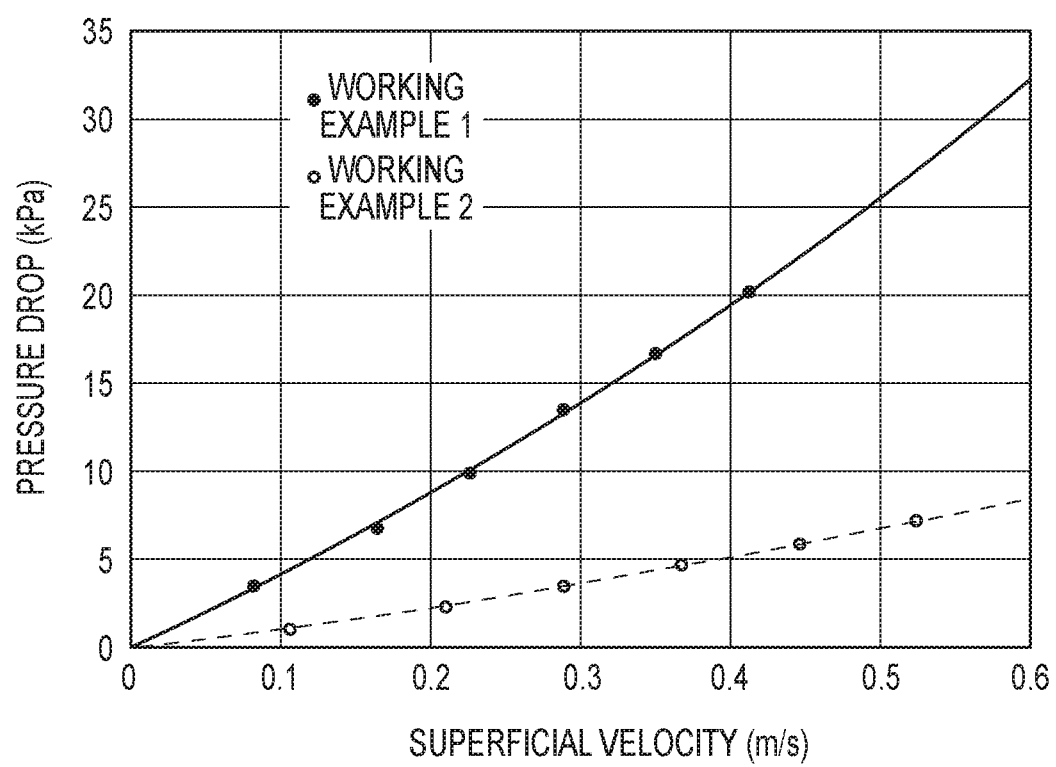
FIG. 8 is a graph of pressure drop versus superficial velocity for product fluid flow, which compared a membrane module according to an embodiment of the present disclosure to a conventional membrane module.

FIG. 8 is a graph of pressure drop versus superficial velocity for product fluid flow, which compared a membrane module according to an embodiment of the present disclosure to a conventional membrane module. The conventional membrane module of working example 1 having feed spacers without having openings formed therein (e.g., openings 118 shown in FIGS. 3 and 6) was comparatively tested against a membrane module according an embodiment of the present disclosure of working example 2 having feed spacers that had two large openings similar to the membrane module 100.

The membrane modules of working examples 1 and 2 each included membranes that were 0.0060 inch embedded-support CTA, the permeate spacer was 0.020 epoxy-coated polyester, and the feed spacer was 0.085 inch corrugated polystyrene. The membrane module of working example 1 had a membrane leaf length of about 28.000 inch, a feed spacer length of about 29.000 inch, 3 leaves, and a membrane area of about 3.01 m$^2$. The membrane module of working example 2 had a membrane leaf length of about 28.875 inch, a feed spacer length of about 31.750 inch, 2 leaves, and a membrane area of about 2.24 m$^2$.

The pressure drop of the membrane modules of working examples 1 and 2 was evaluated by pumping a test solution of water at 25° C. as product fluid into the respective feed spacers of the membrane modules of working examples 1 and 2. As shown in FIG. 8, the openings of the membrane module of working example 2 provided a relatively lower pressure drop that is about 20% to about 30% that of the pressure drop of the membrane module of working example 1. This relatively lower pressure drop reduces the pumping energy for pumping the product fluid flow into the membrane module.

While various aspects and embodiments have been disclosed herein, other aspects and embodiments are contemplated. The various aspects and embodiments disclosed herein are for purposes of illustration and are not intended to be limiting.

What is claimed is:

1. A method of manufacturing a multi-leaf membrane module, the method comprising:
providing a membrane sheet including two or more leaves, each of the two or more leaves including a feed spacer having at least one removable section and a permeate structure including at least one membrane and at least one permeate spacer;
while adhesive in the permeate structure is at least partially uncured, spirally winding the membrane sheet around a permeate fluid flow tube;
allowing the adhesive to at least partially cure while the membrane sheet is wound around the permeate fluid flow tube;
after the adhesive is at least partially cured, at least partially unwinding the membrane sheet from the permeate fluid flow tube;
while the membrane sheet is at least partially unwound, removing the at least one removable section from the feed spacer of each of the two or more leaves to form at least one opening therein that at least partially defines a product fluid flow channel; and
after removing the at least one removable section, spirally winding the membrane sheet having the at least one opening therein about the permeate fluid flow tube.

2. The method of claim 1, further comprising forming a protective shell about an exterior of the spiral wound membrane sheet having the two or more openings.

3. The method of claim 2 wherein the shell includes fiberglass.

4. The method of claim 1 wherein the feed spacer of each of the two or more leaves includes a corrugated spacer material.

5. The method of claim 1 wherein the feed spacer of each of the two or more leaves includes a plastic mesh.

6. The method of claim 1 wherein the at least one removable section of the feed spacer of each of the two or more leaves includes perforations defining a perimeter thereof.

7. The method of claim 6 wherein removing the at least one removable section from the feed spacer of each of the two or more leaves includes breaking the perforations on the feed spacer of each of the two or more leaves.

8. The method of claim 1 wherein removing the at least one removable section from the feed spacer of each of the two or more leaves includes removing adhesive securing the at least one removable section to the feed spacer of each of the two or more leaves.

9. The method of claim 1 wherein the feed spacer of each of the two or more leaves exhibits a thickness of about 0.020 inch to about 0.20 inch.

10. The method of claim 9 wherein the thickness is about 0.045 inch to about 0.10 inch.

11. The method of claim 1 wherein the at least one permeate spacer includes two or more permeate spacers, wherein the permeate structure of each of the two or more leaves includes a stiffener layer sandwiched between the two porous permeate spacers, and wherein the at least one membrane is positioned radially outward from the two permeate spacers.

12. The method of claim 11 wherein the stiffener layer exhibits a thickness of about 0.020 inch to about 0.050 inch.

\* \* \* \* \*